A. HERRING.
MODE OF DETECTING DEFECTS IN RAILROAD RAILS, &c.
No. 189,858. Patented April 24, 1877.
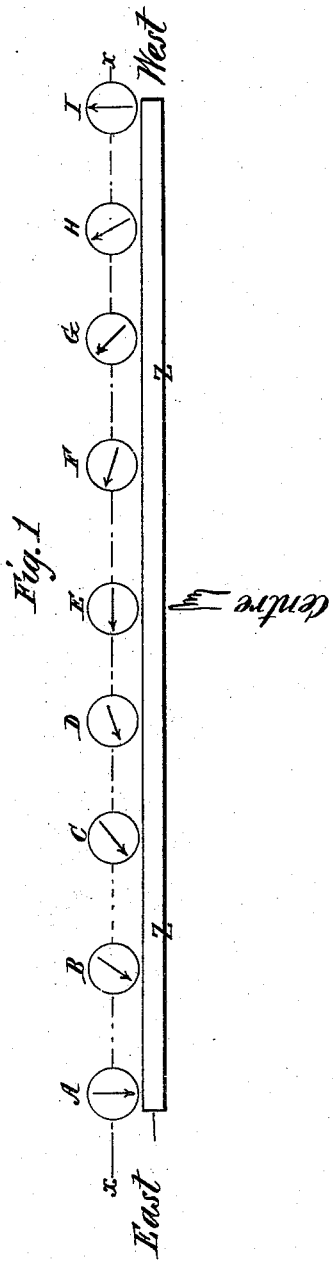
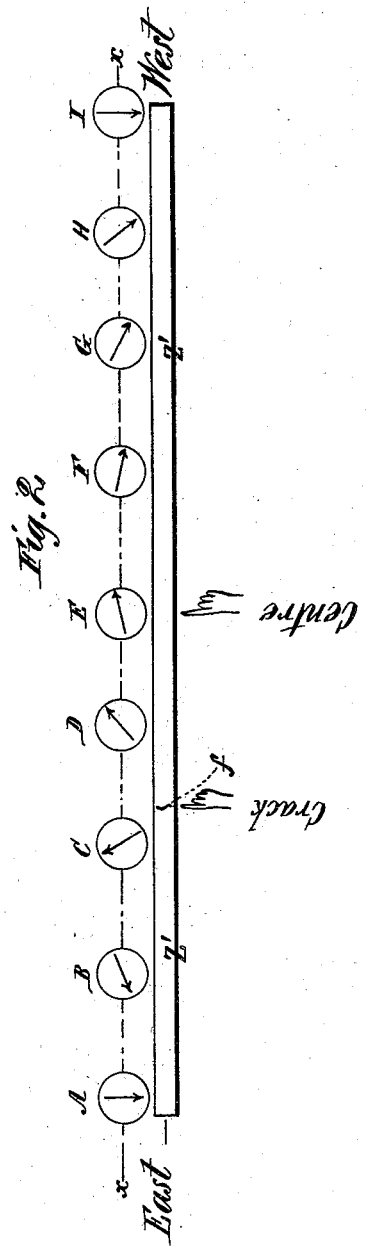
Witnesses.
James Martin Jr.
W. Schaffer
Inventor.
Anaxamander Herring
by
Mason, Fenwick, Lawrence.

UNITED STATES PATENT OFFICE.

ANAXAMANDER HERRING, OF COHOES, NEW YORK.

IMPROVEMENT IN MODES OF DETECTING DEFECTS IN RAILROAD-RAILS, &c.

Specification forming part of Letters Patent No. 189,858, dated April 24, 1877; application filed February 5, 1877.

*To all whom it may concern:*

Be it known that I, ANAXAMANDER HERRING, of Cohoes, in the county of Albany and State of New York, have invented a new and useful Method or Mode of Detecting Defects in Railroad-Rails and other metallic bars, which invention is fully set forth in the following specification, reference being had to the accompanying drawings.

The object of my invention is to ascertain where latent or hidden defects, such as cracks, flaws, imperfect welds, and molecular change occur in metallic structures.

In testing bars, rods, shafts, or plates of metal, in order to ascertain defects therein, by my invention, if the metal to be tested is not already under the influence of terrestrial magnetism, I bring it under the influence of electricity by some one of the many known methods, adopting that method best suited to the conditions under which the test is to be made, and varying the method of applying the electricity to suit the form, size, and position of the metal to be tested. When the iron or other metal has been brought fully under the influence of the electric or magnetic current, I proceed to examine its surface with an electro or magneto meter, using that form of instrument best adapted to the shape, position, &c., of the metal.

For example, Figure 1 of the drawings represents a rail or bar of iron, Z, which is without defect. The bar Z is horizontal, lying east and west. A represents a dip needle or compass resting on top of the east end of the rail Z, at which point the needle of the compass (represented by the arrow) points downward, or, in other words, the positive pole, represented by the arrow-head, is down. Now, as the compass is moved along on top of the rail from east to west, the needle will be found to occupy the position represented by the arrow, as at B, C, D, and E. E being over the center of the rail, and the needle being equally attracted by the two poles of the rail, assumes a position horizontal to the rail on the dotted line x x, with its positive pole pointing to the east end of the rail, and its negative to the west. As the compass is still moved farther on toward the west, the positive pole of the needle rises above the central dotted line x x, while the negative end falls below said line, as at F, G, H, and I, the negative end at I pointing downward. A perfect bar of iron can have but two poles, to wit, a positive pole at one end, and a negative pole at the other.

In testing a railroad or rails upon a track, I first test each end, and immediately thereafter the center of the length, of the rail, and if the needle stands as represented at A, E, and I, I pronounce the rail good. But should the needle not be perpendicular when at the the ends of the bar, and level when over a point central of the length of the bar, or should the needle be perpendicular at the ends and horizontal at the center, and the same end of the needle be down at both ends of the rail, I then know that the rail is not perfect, and proceed to detect the locality of the flaw or imperfection in the rail, as indicated in Fig. 2, which I will now describe.

Fig. 2 represents a rail, Z', having a flaw or crystallized place between C and D of said figure. On applying the compass at the east end of this rail I find the needle will assume the same position as at A in Fig. 1, but at B in Fig. 2 the needle has risen almost to a level; at C the needle is nearly perpendicular; and at D the negative end of the needle is turned back toward the east. The indicates an imperfect place, *f*, between C and D, and if I move D back toward C the negative end of the needle will point downward when over the crack or flaw *f*. This crack or flaw having been found and marked, to designate its locality, I then continue the compass west, and if its needle turns gradually over, as indicated at D E F G H I, and the positive pole points down at the west end of the rail, I then know that the rail is sound with the exception of the flaw at *f*. If there are other faults or cracks in the bar they will be pointed out the same as at *f* between C and D, by the needle reversing. In other words, the needle will turn half over at every flaw—that is to say, the needle turns over one hundred and eighty degrees of the circle in passing from one end of the rail to the first flaw, and turns over the like space or number of degrees when the compass is moved on from the first to the second flaw, and so on in like manner, should there be more than two flaws between the two ends of the rail. I find that a crack or fault in the usual railroad-rail, (of sixty pounds to the yard,) which has diminished the strength of the rail one-half, is indicated by a one-half revolution of the needle, while a flaw in a wire of one-tenth of an inch in diameter, and sufficient to reduce its tensile strength to one-half, will cause the needle to retrograde or fall back about five degrees, and in proportion as the fault is greater or less.

I would state that a bar of iron, while lying in any position, may be tested with the compass by the use of a battery or a magnet in conjunction with the compass, the battery or magnet being used to overcome terrestrial electricity or magnetism. But when the bar and dip-needle are at right angles to the magnetic meridian the terrestrial influence is overcome by these conditions alone, and the use of the battery or the magnet is unnecessary.

My invention, it will be seen, is one of great utility where it is important to ascertain defects which weaken the natural strength of metal—as, for instance, in heavy shafting for steamships, iron bridges, and steel and cast-metal ordnance, and where very large pieces of metal are to be tested it is in some cases necessary to use a battery, in which case the magnet is placed in a helix, the wires of which are connected with any of the different kinds of batteries in use for telegraphing.

Having described my invention, what I claim as new, and desire to secure by Letters Patent, is—

The method, substantially as described, of testing a metallic bar or other mass of metal, consisting in magnetizing the bar or metal, and passing a magnetic compass or dipping-needle or other like magnetic indicator along the bar or metal in contact with its surface, or nearly so, for the purpose set forth.

Witness my hand in the matter of my application for a patent for an improved method or mode of detecting defects in railroad-rails and other metallic bars this 1st day of February, A. D. 1877.

ANAXAMANDER HERRING.

Witnesses:
   T. W. REYNOLDS,
   A. C. FOX.

Correction in Letters Patent No. 189,858.

It is hereby certified that in Letters Patent No. 189,858, granted April 24, 1877, upon the application of Anaxamander Herring, of Cohoes, New York, for an improvement in "Modes of Detecting Defects in Railroad-Rails, &c.," an error appears requiring the following correction: On page 1, second column, line 29, the sentence commencing "The indicates" should commence *This indicates;* and that the Letters Patent should be read with this correction therein to make the same conform to the record of the case in the Patent Office.

Signed, countersigned, and sealed this 24th day of January, A. D. 1888.

[SEAL.]

D. L. HAWKINS,
*Acting Secretary of the Interior.*

Countersigned:

BENTON J. HALL,
*Commissioner of Patents.*